(12) United States Patent
Wagner et al.

(10) Patent No.: US 9,443,350 B2
(45) Date of Patent: Sep. 13, 2016

(54) REAL-TIME 3D RECONSTRUCTION WITH POWER EFFICIENT DEPTH SENSOR USAGE

(71) Applicant: QUALCOMM Incorporated, San Diego, CA (US)

(72) Inventors: Daniel Wagner, Vienna (AT); Alessandro Mulloni, Vienna (AT); Gerhard Reitmayr, Vienna (AT); Daniel Knoblauch, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/730,146

(22) Filed: Jun. 3, 2015

(65) Prior Publication Data

US 2015/0294499 A1    Oct. 15, 2015

Related U.S. Application Data

(63) Continuation of application No. 14/161,140, filed on Jan. 22, 2014, now Pat. No. 9,083,960.

(60) Provisional application No. 61/758,699, filed on Jan. 30, 2013, provisional application No. 61/769,465, filed on Feb. 26, 2013.

(51) Int. Cl.
*H04N 13/02* (2006.01)
*G06T 17/00* (2006.01)

(52) U.S. Cl.
CPC ............ *G06T 17/00* (2013.01); *H04N 13/0203* (2013.01); *H04N 13/0253* (2013.01); *H04N 13/0271* (2013.01); *G06T 2200/08* (2013.01)

(58) Field of Classification Search
CPC .............. G06T 17/00; G06T 2200/08; H04N 13/0253; H04N 13/0271; H04N 13/0203
USPC .......................................................... 348/46
See application file for complete search history.

(56) References Cited

U.S. PATENT DOCUMENTS

| | | | |
|---|---|---|---|
| 2009/0033655 A1* | 2/2009 | Boca ...................... | B25J 9/1697 345/419 |
| 2012/0075534 A1 | 3/2012 | Katz et al. | |

(Continued)

FOREIGN PATENT DOCUMENTS

| | | |
|---|---|---|
| CN | 102027434 A | 4/2011 |
| JP | H0895487 A | 4/1996 |

(Continued)

OTHER PUBLICATIONS

Taiwan Search Report—TW103103655—TIPO—Dec. 7, 2015.

(Continued)

*Primary Examiner* — Allen Wong
(74) *Attorney, Agent, or Firm* — Silicon Valley Patent Group LLP

(57) ABSTRACT

Embodiments disclosed facilitate resource utilization efficiencies in Mobile Stations (MS) during 3D reconstruction. In some embodiments, camera pose information for a first color image captured by a camera on an MS may be obtained and a determination may be made whether to extend or update a first 3-Dimensional (3D) model of an environment being modeled by the MS based, in part, on the first color image and associated camera pose information. The depth sensor, which provides depth information for images captured by the camera, may be disabled, when the first 3D model is not extended or updated.

30 Claims, 6 Drawing Sheets

(56) References Cited

U.S. PATENT DOCUMENTS

| | | | |
|---|---|---|---|
| 2012/0185094 | A1 | 7/2012 | Rosenstein et al. |
| 2012/0194644 | A1* | 8/2012 | Newcombe ............... G06T 7/20 348/46 |
| 2012/0229508 | A1 | 9/2012 | Wigdor et al. |
| 2012/0306876 | A1 | 12/2012 | Shotton et al. |
| 2013/0009865 | A1 | 1/2013 | Valik et al. |
| 2014/0139639 | A1 | 5/2014 | Wagner et al. |
| 2015/0146926 | A1 | 5/2015 | Ramachandran et al. |

FOREIGN PATENT DOCUMENTS

| | | |
|---|---|---|
| JP | H09329416 A | 12/1997 |
| JP | 2014511591 A | 5/2014 |
| TW | 201234278 A | 8/2012 |

OTHER PUBLICATIONS

"Digiclops" Jul. 25, 2004. XP055117393. Retrieved from the Internet: URL:https://web.archive.orgjweb/20040725151650/http://www.ptgrey.comjproducts/digicl ops/digiclops.pdf [retrieved on May 12, 2014], pp. 1-2, the whole document.

International Search Report and Written Opinion—PCT/US2014/013211—ISA/EPO—May 20, 2014.

"Iterative Closest Point" at "http://en.wikipedia.org/wik/Iterative_closest_point" as available on Jan. 14, 2015, 3 Pages.

Izadi S., et al., "KinectFusion: Real-Time 3D Reconstruction and Interaction using a Moving Depth Camera," Proceedings of the 24th annual ACM symposium on User interface software and technology (UIST), 2011, pp. 559-568.

Kriegel S .,et al., "A surface-based Next-Best-View approach for automated 3D model completion of unknown objects". Robotics and Automation (ICRA). 2011 IEEE International Conference on. IEEE. May 9, 2011. pp. 4869-4874. XP032033810. DOI: 10.1109/ICRA.2011.5979947 ISBN: 978-1-61284-386-5 abstract section V: par. 3.

Lieberknecht S., et al., "RGB-D Camera-Based Parallel Tracking and Meshing," Proceedings of the 2011 10th IEEE International Symposium on Mixed and Augmented Reality (ISMAR '11), Basel, Switzerland, Oct. 26-29, 2011, pp. 147-155.

Liu Y., et al., "Interactive 3D model 1-30 acquisition and registration". Computer Graphics and Applications. 2003. Proceedings. 11th Pacific Conference on Oct. 8-10, 2003. Piscataway. NJ. USA. IEEE. Oct. 8, 2003. pp. 115-122. XP010662462. DOI: 10.1109/PCCGA.2003.1238253 ISBN: 978-0-7695-2028-5 abstract section 4. 5.2. 7.2; figures 1.4.

Newcombe R. A., et al., "KinectFusion: Real-Time Dense Surface Mapping and Tracking," Proceedings of the 2011 10th IEEE International Symposium on Mixed and Augmented Reality (ISMAR '11), 2011, pp. 127-136.

Rusinkiewicz S ., et al., "Real-time 3D model acquisition". SIGGRAPH '02: 29th International Conference on Computer Graphics and Interactive Techniques—Jul. 21-26, 2002—San Antonio. TX. USA. ACM. US. vol. 21. No. 3. Jul. 2002. pp. 438-446. XP002569538. ISBN: 978-1-58113-521-3 abstract section 2; figure 1.

* cited by examiner

REAL-TIME 3D RECONSTRUCTION WITH POWER EFFICIENT DEPTH SENSOR USAGE

CROSS REFERENCE TO RELATED APPLICATIONS

This application is a continuation of U.S. application Ser. No. 14/161,140 entitled "Real-Time 3D Reconstruction with Power Efficient Depth Sensor Usage" filed Jan. 22, 2014. U.S. application Ser. No. 14/161,140 claims the benefit of and priority to U.S. Provisional Application No. 61/758,699 entitled "Real-Time 3D Reconstruction with Power Efficient Depth Sensor Usage" filed Jan. 30, 2013, and U.S. Provisional Application No. 61/769,465 entitled "Real-Time 3D Reconstruction with Power Efficient Depth Sensor Usage" filed Feb. 26, 2013. All of the above-identified U.S. Patent Applications and Provisional Patent Applications are incorporated by reference in their entireties herein.

FIELD

This disclosure relates generally to apparatus and methods for power efficiency in mobile devices.

BACKGROUND

In computer vision and computer graphics, 3D reconstruction is the process of determining the shape and/or appearance of real objects. 3D reconstruction may be based on data and/or images of an object obtained from various types of sensors. For example, cameras may be used to measure radiance or light reflected by or emitted from an object's surface and the 3D structure or model of the object may then be inferred from images of the object captured by the camera and from information provided by other sensors. In general, the term 3D model is used herein to refer to a representation of a 3D environment.

Typically, in 3D reconstruction, a set of digital images is processed offline in batch mode along with other sensory information to obtain a 3D model, which may take the form of a 3D mesh of the object. However, because 3D reconstruction has traditionally been computationally expensive, it has often been performed off line and results of the 3D reconstruction were typically available much later. Thus, practical real time applications that use 3D reconstruction have been hitherto limited.

More recently real-time or near real-time 3D reconstruction has gained traction due to a combination of factors including the availability of increased processing power, advanced algorithms, as well as new forms of input data. Users may now obtain feedback on 3D reconstruction in near real-time as captured pictures are processed rapidly by computing devices, including mobile devices. However, many techniques used for 3D reconstruction are power hungry and result in relatively high power use. In mobile devices, for example, increased power consumption may drain the power source or battery thereby limiting the practical applicability of 3D construction.

Therefore, there is a need for apparatus, systems and methods to facilitate power efficient real-time 3D reconstruction on computing and mobile devices.

SUMMARY

According to some aspects, disclosed is a method for power efficient real-time 3d reconstruction on a mobile device. In some embodiments, the Mobile Station (MS) may comprise at least one camera and a depth sensor and the method may comprise: capturing a first image with at least one camera, wherein the first image comprises color information for at least a portion of an environment being modeled by the MS and obtaining camera pose information for the first image. In some embodiments, the method may further comprise: determining, based, in part, on the first captured image and the camera pose information for the first image, whether to extend a first 3-Dimensional (3D) model of the environment; and disabling the depth sensor, when the first 3D model is not extended.

In another aspect, an MS may comprise: a camera, which may capture a first image comprising color information, a depth sensor coupled to the camera, and a processor coupled to the depth sensor and the camera. In some embodiments, the processor may be configured to: obtain camera pose information for the first image; determine, based, in part, on the first image and the camera pose information for the first image, whether to extend a first 3-Dimensional (3D) model of an environment being modeled by the MS; and disable the depth sensor, if the first 3D model is not extended.

In a further aspect, disclosed embodiments pertain to an apparatus comprising: imaging means, the imaging means to capture a first image comprising color information; depth sensing means coupled to the imaging means, and processing means coupled to the depth sensing means and the imaging means. In some embodiments, the processing means may further comprise: means for obtaining imaging means pose information for the first image; means for determining whether to extend a first 3-Dimensional (3D) model of an environment being modeled by the apparatus based, in part, on the first image and the imaging means pose information for the first image; and means for disabling the depth sensing means, if the first 3D model is not extended.

Disclosed embodiments also pertain to non-transitory computer-readable media comprising instructions, which when executed by a processor, perform steps in a method on an MS comprising at least one camera and a depth sensor. In some embodiments, the method may comprise: capturing a first image with at least one camera, wherein the first image comprises color information for at least a portion of an environment being modeled by the MS and obtaining camera pose information for the first image. In some embodiments, the method may further comprise: determining, based, in part, on the first captured image and the camera pose information for the first image, whether to extend a first 3-Dimensional (3D) model of the environment; and disabling the depth sensor, when the first 3D model is not extended.

In another aspect, a method on a Mobile Station (MS) comprising at least one camera and a depth sensor, may comprise: capturing a first image with at least one camera, the first image comprising color information for at least a portion of an environment being modeled by the MS; obtaining camera pose information for the first image; determining, based, in part, on the first captured image and the camera pose information for the first image, whether to update a first 3-Dimensional (3D) model of the environment; and disabling the depth sensor, when the first 3D model is not updated. Further, disabling the depth sensor may comprise at least one of: turning off power supplied to the depth sensor, or disabling functionality related to computation of a depth image. The method may further comprise: enabling the depth sensor, when the first 3D model is updated. Upon enabling the depth sensor, the first 3D model may be updated by: capturing a second image with the at least one camera;

obtaining a depth map by augmenting the second image with depth information provided, at least in part, by the depth sensor; and updating a volumetric data set in the first 3D model with the depth information. In some embodiments, the volumetric dataset may be represented by a 3D Truncated Signed Distance Function (TDSF). The volumetric data set may be updated by projecting samples in the 3D TDSF into the depth map based on the camera pose; determining a measured relative distance from the sample location to a surface defined by the volumetric dataset; mapping the measured relative distance to the TDSF; and combining the mapped TDSF value with a stored TDSF value for the sample.

In another aspect, an MS may comprise: a camera, which may capture a first image comprising color information, a depth sensor coupled to the camera, and a processor coupled to the depth sensor and the camera. In some embodiments, the processing means may be configured to: obtain camera pose information for the first image; determine, based, in part, on the first image and the camera pose information for the first image, whether to update a first 3-Dimensional (3D) model of the environment; and disabling the depth sensor, when the first 3D model is not updated.

In a further aspect, disclosed embodiments pertain to an apparatus comprising: imaging means, the imaging means to capture a first image comprising color information; depth sensing means coupled to the imaging means, and processing means coupled to the depth sensing means and the imaging means. In some embodiments, the processing means may further comprise: means for obtaining camera pose information for the first image; means for determining, based, in part, on the first image and the camera pose information for the first image, whether to update a first 3-Dimensional (3D) model of the environment; and means for disabling the depth sensor, when the first 3D model is not updated.

Disclosed embodiments also pertain to non-transitory computer-readable media comprising instructions, which when executed by a processor, perform steps in a method on an MS comprising at least one camera and a depth sensor. In some embodiments, the method may comprise: capturing a first image with at least one camera, the first image comprising color information for at least a portion of an environment being modeled by the MS; obtaining camera pose information for the first image; determining, based, in part, on the first captured image and the camera pose information for the first image, whether to update a first 3-Dimensional (3D) model of the environment; and disabling the depth sensor, when the first 3D model is not updated.

Embodiments disclosed also relate to software, firmware, and program instructions created, stored, accessed, or modified by processors using computer readable media or computer-readable memory. The methods described may be performed on processors and various mobile devices.

These and other embodiments are further explained below with respect to the following figures. It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

Embodiments of the invention will be described, by way of example only, with reference to the drawings.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Figure 1:
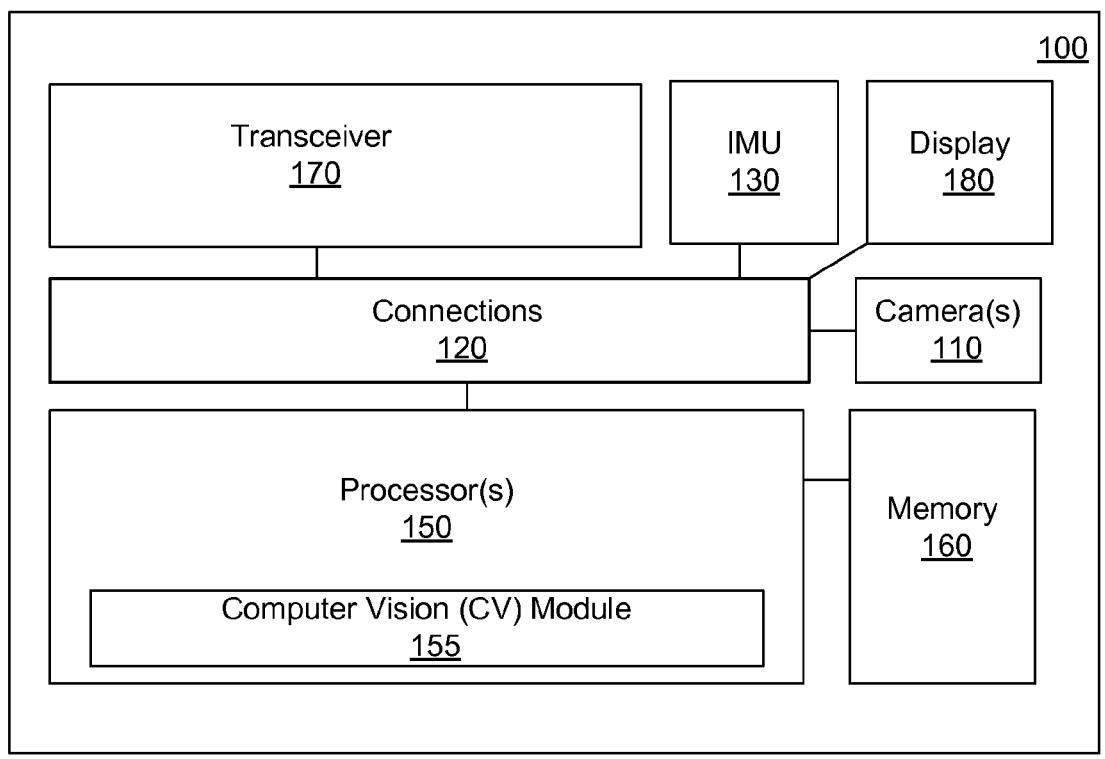
FIG. 1 shows a block diagram of an exemplary mobile device capable of power efficient 3D reconstruction.

FIG. 1 shows a block diagram of an exemplary Mobile Station (MS) 100 capable of performing real time or near real time 3D construction in a manner consistent with disclosed embodiments. As used herein, mobile device or mobile station (MS) 100, may take the form of a cellular phone, mobile phone, or other wireless communication device, a personal communication system (PCS) device, personal navigation device (PND), Personal Information Manager (PIM), or a Personal Digital Assistant (PDA), a laptop, tablet, notebook and/or handheld computer. The terms mobile device or mobile station are used interchangeably herein. In some embodiments, MS 100 may be capable of receiving wireless communication and/or navigation signals. The terms "mobile device" and "mobile station" are used interchangeably herein.

Further, the term "mobile station" is also intended to include devices which communicate with a personal navigation device (PND), such as by short-range wireless, infrared, wireline connection, or other connections and/or position-related processing occurs at the device or at the PND. Also, "mobile station" is intended to include all devices, including various wireless communication devices, which are capable of communication with a server, regardless of whether wireless signal reception, assistance data reception, and/or related processing occurs at the device, at a server, or at another device associated with the network. Any operable combination of the above are also considered a "mobile station."

The term "mobile station" is also intended to include gaming or other devices that may not be configured to connect to a network or to otherwise communicate, either wirelessly or over a wired connection, with another device. For example, a "mobile station" may omit communication elements and/or networking functionality. For example, embodiments described herein may be implemented in a standalone device that is not configured to connect for wired or wireless networking with another device.

As shown in FIG. 1, MS 100 may include cameras 110, Inertial Measurement Unit (IMU) 130, processors 150, memory 160 and/or transceiver 170, display/screen 180 which may be operatively coupled to each other and to other functional units (not shown) on MS 110 through connections 120. Connections 120 may comprise buses, lines, fibers, links, etc., or some combination thereof.

Transceiver 170 may, for example, include a transmitter enabled to transmit one or more signals over one or more types of wireless communication networks and a receiver to receive one or more signals transmitted over the one or more types of wireless communication networks. Transceiver 170 may permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, etc, and/or Wireless Wide Area Networks (WWANs) such as LTE, WiMAX, etc. MS 100 may also include one or more ports for communicating over wired networks.

In some embodiments, MS 100 may comprise image sensors such as CCD or CMOS sensors and/or cameras 110, which are hereinafter referred to as "cameras 110". Cameras 110 may convert an optical image into an electronic or digital image and may send captured images to processor 150.

In general, cameras 110 may be color or grayscale cameras, which provide "color information," while "depth information" may be provided by a depth sensor. The term "color information" as used herein refers to color and/or grayscale information. In general, as used herein, a color image or color information may be viewed as comprising 1 to N channels, where N is some integer dependent on the color space being used to store the image. For example, an RGB image comprises three channels, with one channel each for Red, Blue and Green information.

Depth information may be captured in a variety of ways using depth sensors. The term "depth sensor" is used to refer to functional units that may be used to obtain depth information independently and/or in conjunction with cameras 110. In some embodiments, depths sensors may be disabled, when not in use. For example, the depth sensor may be placed in a standby mode, or powered off when not being used. In some embodiments, processors 150 may disable (or enable) depth sensing at one or more points in time in a manner consistent with disclosed embodiments. The term "disabling the depth sensor" is also used to refer to disabling passive sensors such as stereo vision sensors and/or functionality related to the computation of depth images, including hardware, firmware, and/or software associated with such functionality. For example, in one embodiment, when a stereo vision sensor is disabled images captured by camera 110 may be monocular. Further, the term "disabling the depth sensor" is also used to refer to disabling computation associated with the processing of stereo images captured from passive stereo vision sensors. For example, in one embodiment, although stereo images may be captured by a passive stereo vision sensor, processors 150 may not process the stereo images and may instead select a single image from the stereo pair for processing.

In some embodiments, the depth sensor may be part of cameras 110. For example, in some embodiments, MS 100 may comprise RGBD cameras, which may capture per-pixel depth (D) information when the depth sensor is enabled, in addition to color (RGB) images.

As another example, in some embodiments, camera 110 may take the form of a 3D Time Of Flight (3DTOF) camera. In embodiments with 3DTOF cameras 110, the depth sensor may take the form of a strobe light coupled to the 3DTOF camera 110, which may illuminate objects in a scene and reflected light may be captured by a CCD/CMOS sensor in camera 110. Depth information may be obtained by measuring the time that the light pulses take to travel to the objects and back to the sensor.

As a further example, the depth sensor may take the form of a light source coupled to cameras 110. In one embodiment, the light source may project a structured or textured light pattern, which may consist of one or more narrow bands of light, onto objects in a scene. Depth information may then be obtained by exploiting geometrical distortions of the projected pattern caused by the surface shape of the object. In one embodiment, depth information may be obtained from stereo sensors such as a combination of an infra-red structured light projector and an infra-red camera registered to a RGB camera.

In some embodiments, cameras 110 may take the form of stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, MS 100 may comprise multiple cameras 110, such as dual front cameras and/or a front and rear-facing cameras, which may also incorporate various sensors. In some embodiments, cameras 110 may be capable of capturing both still and video images. In some embodiments, cameras 110 may be RGBD or stereoscopic video cameras capable of capturing images at 30 frames per second (fps). In one embodiment, images captured by cameras 110 may be in a raw uncompressed format and may be compressed prior to being processed and/or stored in memory 160. In some embodiments, image compression may be performed by processors 150 using lossless or lossy compression techniques.

In some embodiments, processors 150 may also receive input from IMU 130. In other embodiments, IMU 130 may comprise 3-axis accelerometer(s), 3-axis gyroscope(s), and/or magnetometer(s). IMU 130 may provide velocity, orientation, and/or other position related information to processor 150. In some embodiments, IMU 130 may output measured information in synchronization with the capture of each image frame by cameras 130. In some embodiments, the output of IMU 130 may be used in part by processor 150 to determine a pose of camera 110 and/or MS 100.

Further, MS 100 may include a screen or display 180 capable of rendering color images, including 3D images. In some embodiments, display 170 may be used to display live images captured by camera 110, Augmented Reality (AR) images, Graphical User Interfaces (GUIs), program output, etc. In some embodiments, display 180 may comprise and/or be housed with a touchscreen to permit users to input data via some combination of virtual keyboards, icons, menus, or other Graphical User Interfaces (GUIs), user gestures and/or input devices such as styli and other writing implements. In some embodiments, display 180 may be implemented using a Liquid Crystal Display (LCD) display or a Light Emitting Diode (LED) display, such as an Organic LED (OLED) display. In other embodiments, display 180 may be a wearable display, which may be operationally coupled to, but housed separately from, other functional units in MS 100. In some embodiments, MS 100 may comprise ports to permit the display of the 3D reconstructed images through a separate monitor coupled to MS 100.

The pose of camera 110 refers to the position and orientation of the camera 110 relative to a frame of reference. In some embodiments, camera pose may be determined for 6-Degrees Of Freedom (6DOF), which refers to three translation components (which may be given by X,Y,Z coordinates of a frame of reference) and three angular components (e.g. roll, pitch and yaw relative to the same frame of reference).

In some embodiments, the pose of camera 110 and/or MS 100 may be determined and/or tracked by processor 150 using a visual tracking solution based on images captured by camera 110. For example, a Computer Vision (CV) Module 155 running on processor 150 may implement and execute computer vision based tracking, model-based tracking, and/or Simultaneous Localization And Mapping (SLAM) methods. SLAM refers to a class of techniques where a map of an environment, such as a map of an environment being modeled by MS 100, is created while simultaneously tracking the camera's pose relative to that map. In some embodiments, the methods implemented by CV module 155 may be based on color or grayscale image data captured by cameras 110 and may be used to generate estimates of 6DOF pose measurements of the camera. In some embodiments, the output of IMU 130 may be used to estimate, correct, and/or otherwise adjust the estimated pose. Further, in some embodiments, images captured by cameras 110 may be used to recalibrate or perform bias adjustments for IMU 130.

Not all functional units comprised in MS 100 have been shown in FIG. 1. Exemplary MS 100 may also be modified in various ways in a manner consistent with the disclosure, such as, by adding, combining, or omitting one or more of the functional blocks shown. For example, in some configurations, MS 100 may not include IMU 130, or Transceiver 170. Further, in certain example implementations, MS 100 may include a variety of other sensors (not shown) such as an ambient light sensor, microphones, acoustic sensors, ultrasonic sensors, laser range finders, etc. In some embodiments, portions of MS 100 may take the form of one or more chipsets, and/or the like.

Processors 150 may be implemented using a combination of hardware, firmware, and software. Processors 150 may represent one or more circuits configurable to perform at least a portion of a computing procedure or process related to 3D reconstruction, SLAM, tracking, image processing etc and may retrieve instructions and/or data from memory 160. Processors 150 may be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

Memory 160 may be implemented within processors 150 and/or external to processors 150. As used herein the term "memory" refers to any type of long term, short term, volatile, nonvolatile, or other memory and is not to be limited to any particular type of memory or number of memories, or type of physical media upon which memory is stored. In some embodiments, memory 160 may hold program code that facilitates one or more image processing, perform SLAM, tracking, 3D reconstruction, and other tasks performed by CV Module 155 on processor 150. For example, memory 160 may hold data, captured still images, depth information, video frames, program results, as well as data provided by IMU 130 and other sensors. In general, memory 160 may represent any data storage mechanism. Memory 160 may include, for example, a primary memory and/or a secondary memory. Primary memory may include, for example, a random access memory, read only memory, etc. While illustrated in FIG. 1 as being separate from processors 150, it should be understood that all or part of a primary memory may be provided within or otherwise co-located and/or coupled to processors 150.

Secondary memory may include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory may be operatively receptive of, or otherwise configurable to couple to a non-transitory computer-readable medium in a removable media drive (not shown) coupled to MS 100. In some embodiments, non-transitory computer readable medium may form part of memory 160 and/or processor 150.

In some embodiments, CV module 155 may implement various computer vision methods and/or process images captured by camera 110. For example, CV module 155 may be capable of processing one or more images captured by camera 110 to perform 3D reconstruction of an environment being modeled using depth information associated with the captured images. In some embodiments, the depth information may be obtained from depth sensors.

Based on the depth data, during reconstruction each pixel may be assigned a 3D coordinate. In one embodiment, CV module 155 on processor 150 may track the position of camera 110 by using a monocular (single camera) visual SLAM system to build a coarse map of the environment around the MS for accurate and robust 6DOF tracking of camera 110. The term monocular refers to the use of a single non-stereoscopic camera to capture images or to images captured without depth information. A 3D reconstruction module may then use the camera pose and per-pixel depth information to extrude the captured image(s) along a viewing direction and create a textured dense 3D mesh, which may be used to render the 3D environment being modeled.

In conventional 3D reconstruction methods, all input samples are always of the same modality such as color+ depth pairs. Consequently, the acquisition of depth data using depth sensors such as structured light or strobes may consume substantially more power than a simple RGB camera. Further, although depth from stereo vision sensors may use passive sensing, the computational overhead from continual stereo fusion operations during 3D reconstruction may increase power consumption significantly. Therefore, conventional real time 3D reconstruction in mobile devices is often impractical because of power availability constraints. For example, repeated use of strobes or other light sources may quickly deplete the battery on an MS, thereby limiting the applicability of 3D reconstruction.

Figure 2A:
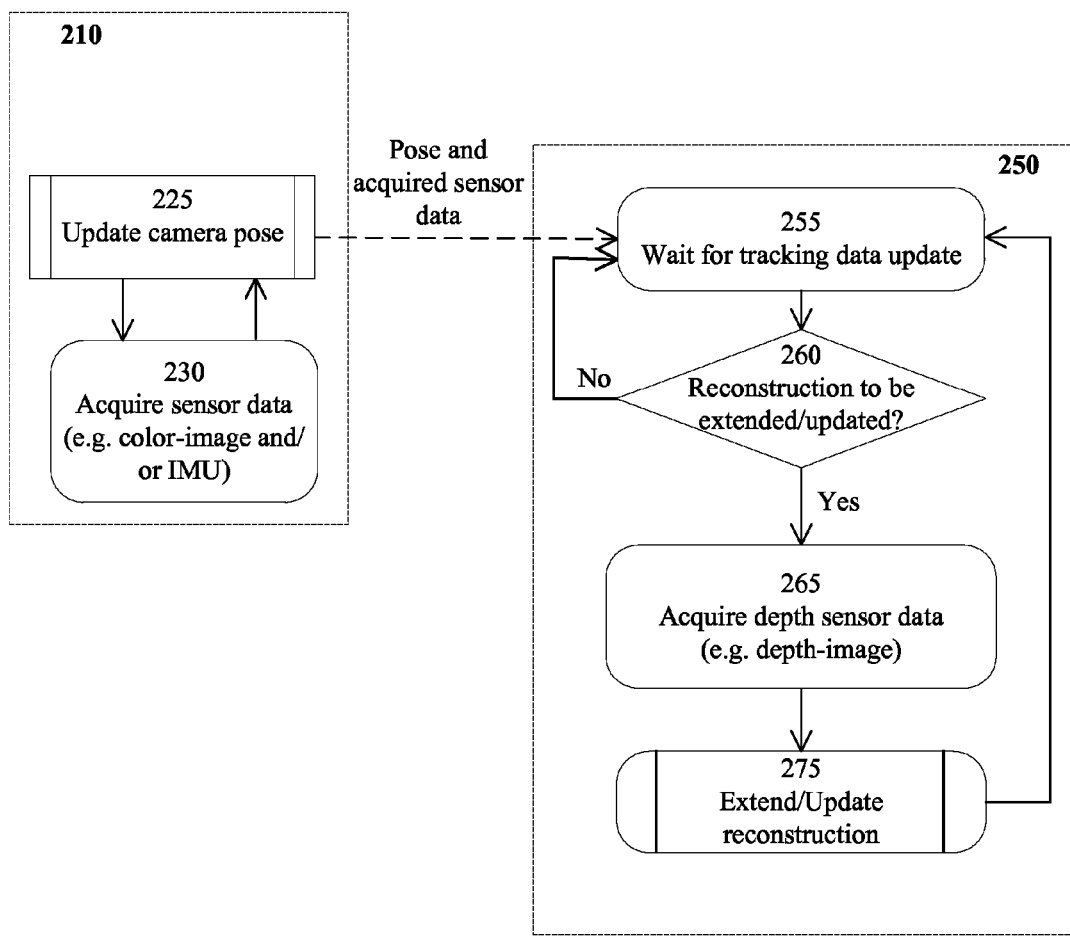
FIGS. 2A and 2B show flowcharts for an exemplary method for power efficient 3D reconstruction consistent with disclosed embodiments.
Figure 2B:
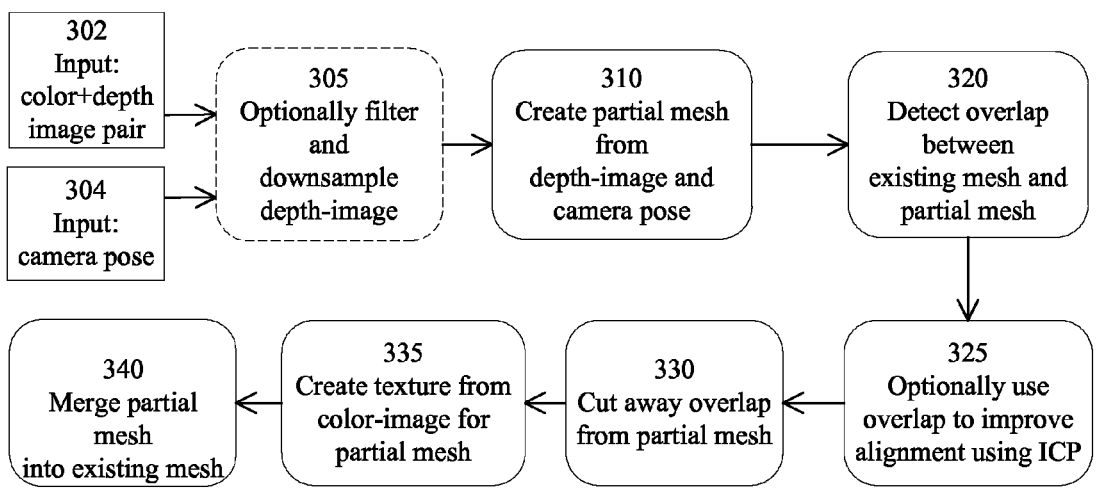
Figure 2C:
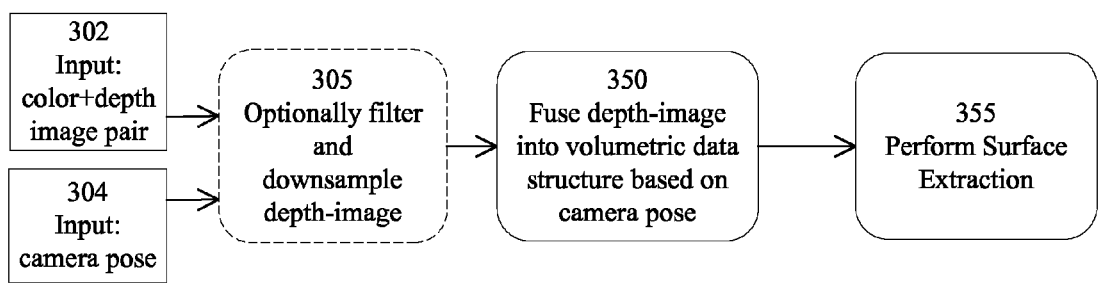
FIG. 2C shows a flowchart for routine or method 275 to extend reconstruction using a volumetric reconstruction technique consistent with disclosed embodiments.

FIGS. 2A-2C show flowcharts for an exemplary method for power efficient 3D reconstruction consistent with disclosed embodiments. In some embodiments, method 200 may be performed by processing units 150 on MS 100 in conjunction with one or more other functional units. In some embodiments, portions of method 200 may be performed by CV module 155.

In some embodiments, method 200 may consist of two modules Tracking Module 210 and Reconstruction Module 250. Any real-time tracking system consistent with disclosed embodiments, such as Monocular SLAM (MonoSLAM), Parallel Tracking and Mapping (PTAM), etc., may be selected for use with Tracking Module 210. In some embodiments, Tracking Module 210 and Reconstruction Module 250 may run concurrently. Tracking Module 210 may periodically or continuously track or update camera pose and/or other related non-depth sensor data and provide updated camera pose, sensor information and color images without depth information periodically or upon request to Reconstruction Module 250. In some embodiments, Tracking Module 210 may use a single or monocular camera to capture images without depth information and obtain pose information.

Reconstruction Module 250, which, in some embodiments, may run concurrently with Tracking Module 210, may receive periodic or continuous updates from Tracking Module 210. The updates received from Tracking Module 210 may provide color images without depth information and accurate pose information such as 6DOF pose measurements for cameras 110. In some embodiments, Reconstruction Module 250 may use the updated camera pose and associated image to determine whether to extend an existing 3D model, which may take the form of a color 3D mesh or a volumetric data structure.

The term "extend" (and variants thereof) as used in the context of surface reconstruction refers to addition of newly acquired data from a partial model of the environment to an existing 3D model of the environment. The term "update" (and variants thereof) as used in the context of volumetric reconstruction refers to the combination of newly acquired depth data with an existing 3D model of the environment, which may be represented by a volumetric dataset.

In some embodiments, Reconstruction Module 250 may use any reconstruction technique that does not depend on the input of a depth+color image input for every frame. In some embodiments, Reconstruction Module 250 may be configured to use a fixed lower rate for input of color+depth data. In some embodiments, the fixed lower rate for color+depth data may be configurable based on system parameters. For example, in one embodiment, Reconstruction Module 250 may be configured to receive one color+depth image input after four color-only (i.e. without depth data) frames. In another embodiment, Reconstruction Module 250 may be configured so that the additional depth image (or depth data) can be triggered upon request or provided on demand. In general, depending on system parameters, depth information may be provided at some specified rate or on demand. Accordingly, power savings may result, in part, from the lower frequency of depth sensor use. For example, relative to a system operating at a 30 frame per second frame rate where depth data is provided with every frame, if depth information is provided to Reconstruction Module 250 once every five frames, then, depth sensor use in system 200 may be reduced by a factor of 5. In some embodiments, Reconstruction Module 250 may be configured to use a technique based on surface reconstruction and/or a technique based on volumetric reconstruction.

Reconstruction module 250, which may have previously obtained images with color and depth information, (e.g. by using a depth sensor on MS 100) may have an existing 3D model based on prior captured images with depth information. The captured images with depth information may be represented as a point cloud. For example, the point cloud may be a set of data points that represent the external surface of an object/environment being modeled. The data points may be specified in some coordinate system, for example, using X, Y, and Z coordinates. A 3D mesh, which may comprised of triangles, quadrilaterals, or other polygons, may be generated for example, from the point cloud.

In embodiments of Reconstruction Module 250, where a surface reconstruction technique is applied, a 3D mesh may be obtained based on the 3D point cloud by connecting some subset of points on the 3D point cloud to form triangles, quadrilaterals, or other polygons based on various criteria. A 3D mesh is a collection of vertices, edges and faces that defines the shape of a polyhedral object in 3D. The faces may be triangles, quadrilaterals or other simple convex polygons, which may used to render the 3D object/environment. Several well-known techniques and mesh reconstruction algorithms may be used to convert 3D point clouds (which may be derived from depth maps) into a 3D mesh. In one embodiment, a neighborhood of depth measurements in the depth map may be used as an indicator to form triangles by connecting neighboring points with similar depth measurements.

In embodiments of Reconstruction Module 250, where a volumetric reconstruction technique is applied, the volumetric reconstruction fuses the depth data from the camera frame into a computationally efficient volumetric data structure. In one embodiment, the volumetric reconstruction may use an implicit representation of the surface using a 3D truncated signed distance function (TDSF). The 3D TDSF may be represented as a set of regular samples in 3D space. At each sample, the sample value gives the signed distance to the estimated surface. Positive distances denote samples outside the object, and negative distances samples inside the object.

In some embodiments, Reconstruction Module 250 may use the updated camera pose and associated image obtained from Tracking Module 210 to determine whether to extend or update the existing 3D model (3D mesh or volumetric data structure). In some embodiments, surface and/or volumetric reconstruction techniques may be used for the 3D model and decisions regarding model extensions or updates may be made in a manner consistent with the specific technique being used for the modeling.

For example, in a surface reconstruction approach, based on the image and camera pose received from Tracking Module 120, Reconstruction Module 250 may determine the degree to which the image includes information that is not currently represented in an existing or current model of the environment. In a surface reconstruction approach, if the 3D model of the environment being modeled is to be extended, for example, because the image from Tracking Module 120 includes enough new information, then, image and depth information may then be obtained by turning on the appropriate depth sensors in conjunction with the capture of an image and associated pose information. Otherwise, the depth sensors may be disabled. For example, the depth sensors may be turned off or placed in standby mode.

In some embodiments using volumetric reconstruction, depth data may be acquired/measured at some specified rate (e.g. once every five frames). Otherwise, the depth sensors may be disabled. For example, the depth sensors may be turned off or placed in standby mode.

If the model is to be updated, during volumetric reconstruction, a depth map based on the acquired/measured depth data may be used to determine distances to the estimated surface from a given point in space, such as the location of the camera center, which may be determined based on the camera pose. These measured distances can then be mapped to the signed distance in the volumetric data set. For example, the mapping may be performed by: (i) transforming each sample in the volumetric data set into the camera coordinate system of the depth map and projecting the sample into the depth map; (ii) obtaining a measurement of the distance to the surface along a ray as the distance value at that projected pixel (in the depth map); (iii) obtaining the measured relative distance from the sample point to the surface by subtracting the distance of the of the sample point on the ray from the measured distance obtained in (ii) above; and (iv) updating the distance estimate (s) provided by the sample point on the ray by combining the distance estimate (s) with the relative distance using a recursive filter. For example, one implementation may use weight w with the distance estimate s and update the distance estimate s based on a new measurement m by using a weighted update, which may be given by $$s = \frac{(s*w) + m}{w+1}$$

and w=w+1.

For volumetric reconstruction, in some embodiments, higher quality may be achieved by fusing additional measurements of points or areas of the environment that are already represented in the existing model. Accordingly, in embodiments where volumetric reconstruction is used, the model or 3D mesh may be updated even in situations where there are no new points. In some embodiments, a threshold or other parameters may be set to limit the number of times the same surface element is updated.

Surface extraction may also be performed from the volumetric data representation, if volumetric reconstruction is being used. For example, a computationally efficient volumetric data set comprising voxels may be used to represent a volumetric image, where the voxels may represent a value on a grid in three dimensional space. Various well-known techniques such as Marching Cubes may be used to extract surfaces (or isosurfaces) from the volumetric dataset. An isosurface is a 3D surface representation of points with equal values in a 3D data distribution. In some embodiments, volumetric reconstruction may use a fixed/specified data rate (e.g. 5 color+depth frames per second), which may be dynamically configurable. For example, the frequency of updates from the depth camera may be varied (increased or decreased) based on application requests (e.g. lower or higher accuracy of the model requested) or based on contextual cues (e.g. low or high battery level on the device). In some embodiments, the surface extraction step may be performed independently of the fusion.

Accordingly, in both the surface and volumetric approaches above, the 3D reconstruction module acquires depth data sporadically thereby conserving power. In some embodiments, power savings may accrue from the disabling, turning off, or the placement of sensors in a standby state where they consume no power or very minimal power. For example, if the depth sensors permit quick or almost instantaneous reactivation, then, in one embodiment, power to active sensors may be turned off. In another embodiment, if the sensors the sensors may be placed in a standby mode where they consume minimal power to permit quick and/or instantaneous reactivation. For example, structured light sources and/or strobes may be turned off when the depth sensors are placed in standby mode.

In other embodiments, such as when stereoscopic cameras are used, power savings may accrue from a decrease in the frequency of stereo fusion operations. For example, in embodiments where depth sensors take the form of stereo vision sensors, the stereo vision sensors may be turned off and Tracking Module 210 may continue to provide monocular camera images and associated pose information. In some embodiments, when stereo vision sensors are turned off, computation associated with the processing of stereo images captured from the passive stereo vision sensors may be turned off. For example, in one embodiment, although stereo images may be captured by a passive stereo vision sensor, processors 150 may not process the stereo images and may instead select a single image from the stereo pair for processing.

FIG. 2A shows steps in a running 3D reconstruction process 200. In some embodiments, in routine 225, the camera pose may be updated. For example, a monocular SLAM algorithm running on MS 100 may be used to update the pose of camera 110. By using monocular SLAM, MS 100 may construct a representation of its environment while concurrently estimating the camera's pose or motion relative to the environment.

In routine 225, a single camera may be used to obtain/update pose information, while depth sensors such as strobes, stereo vision sensors, and/or structured light sources may be turned off, disabled, or placed in a standby mode, so that they do not consume power or consume minimal power.

In step 230, new sensor data including color image data without depth information and associated pose information may be acquired and Tracking Module 210 may return to step 225 to begin another iteration and update the camera pose. In general, Tracking Module may use any tracking method to determine pose. For example, input from IMU 130 may be used to determine pose.

An exemplary method for implementing camera pose update routine 225 is described below, although, in practice, any appropriate tracking and pose update method may be used. For inter-frame tracking, the optical flow between an immediately preceding image I and a current image J acquired in step 230 may be computed, for example, by using a Lucas-Kanade algorithm or variants thereof. The Lucas Kanade method is a two-frame differential method for optical flow estimation that may use image gradients and an iterative approach to determine motion parameters.

If I and J are consecutive images of size $n_x \times n_y$, where $0 \le x \le n_x-1$ and $0 \le y \le n_y-1$, and $I(x,y)$ and $J(x,y)$ are the pixel values (e.g. grayscale values) of pixels at point (x, y), then feature tracking may be used to compute the location of a point v in J, which corresponds to point $u=[u_x, u_y]^T$ in I, where $v=u+d=[u_x+d_x, u_y+d_y]^T$. The displacement vector $d=[d_x, d_y]^T$ is termed the optical flow at u and the superscript "T" is used to refer to the transpose of a matrix or vector. A goal of Lucas-Kanade is to find the displacement vector d that minimizes the error function $\epsilon(d)$, where, $$\varepsilon(d) = \varepsilon(d_x, d_y) = \sum_{x=u_x-w}^{x=u_x+w} \sum_{y=u_y-w}^{y=u_y-w} [I(x, y)) - J(x + v_x, y + v_y)]^2 \quad (1)$$

where, w is an integer and represents a window of size w×w pixels.

In some embodiments, a modified real-time pyramidal implementation of the Lucas-Kanade optical flow algorithm or variants thereof may be used to compute the 2D optical flow. For example, the Inverse Compositional Image Alignment variant of the Lucas-Kanade algorithm may be used.

In the pyramidal implementation, an image may be successively downsampled to obtain a pyramid of downsampled images of different resolutions. For example, the highest level (level 0) of the pyramid may have the raw or highest resolution image and each level below may downsample the image relative to the level immediately above by some factor. For example, for an image $I_0$ of size 640×480 (at level 0), the images $I_1$, $I_2$, $I_3$ and $I_4$ are of sizes 320×240, 160×120, 80×60 and 40×30, respectively, where the subscript indicates the image level in the image pyramid.

In pyramidal Lucas-Kanade optical flow, the optical flow is computed at the lowest pyramid level L. Then, the result of that computation is propagated to the upper level L-1 in a form of an initial pixel displacement estimate at level L-1. Given that initial guess, the refined optical flow is computed at level L-1, and the result is propagated to level L-2 and so on up to the level 0 (the original image). Typically, the point v in J corresponding to point u in I is searched within a window (e.g. of size w×w pixels) around the location $[u_x, u_y]$ in image J. Pyramid based optical flow allows for searching over a larger effective window and facilitates the establishment of feature correspondences even in the face of large pixel motions.

In some embodiments, the number of features compared between images during tracking may be determined based on system constraints. For example, the resolutions of the images, the speed of processors 150, and performance criteria may be used to determine the number of features compared.

In some embodiments, based on the location of matching features an updated camera pose may be computed in routine 225. In some embodiments, the pose and acquired sensor data including the color images may be transferred periodically to Reconstruction Module 250, which waits for tracking data updates provided by Tracking Module 210 in step 255. In some embodiments, Tracking Module 210 may run continuously at a frame rate of around 30 frames to capture sensor data including monocular images and update pose information, which may be provided to Reconstruction Module 250.

In some embodiments, in step 260, Reconstruction Module 250 may determine if the existing reconstruction model is to be extended or updated based on the updated captured image and associated pose information received in step 255. In some embodiments, Reconstruction Module 250 may use any reconstruction technique that does not depend on the input of a depth+color image input for every frame. For example, surface and/or volumetric techniques may be used by Reconstruction Module 250.

In some embodiments, for a surface reconstruction, Reconstruction Module 250 may analyze each frame provided by Tracking Module 210 to determine whether the model is to be extended. In another embodiment, Reconstruction Module 250 may select a subset of frames from those provided by Tracking Module 210 for analysis depending on configuration settings, system parameters, and/or a current frame rate of Tracking Module 210 to determine whether the model is to be extended. In some embodiments, the configuration of Tracking Module 210 may be modified by Reconstruction Module 250 to set an appropriate frame rate for image capture.

Further, for a surface reconstruction approach, in some embodiments, the determination whether the existing reconstruction model is to be extended or updated may be based, in part, on a current image and the degree to which the current image includes information that is not currently represented in the existing model.

In some embodiments, if there are points or areas of the environment that are not currently represented in the existing model and that were imaged for the first time in a newly captured camera frame ("Y" in step 260), then, the model or 3D mesh may be extended or updated by acquiring new depth sensor data or depth information, in step 265.

Further, for a surface reconstruction approach, if there are points or areas of the environment that are already represented in the existing model but were imaged for the first time from a different viewpoint in a newly captured camera frame ("Y" in step 260), then, the model or 3D mesh may be extended or updated by acquiring new depth sensor data or depth information, in step 265. In some embodiments, the existence of new points may be determined by computing the difference between the information included in the current image and the information stored in the existing model, and determining if such difference is not empty.

For the surface reconstruction approach, if the existing reconstruction model is to be extended ("Yes" in step 260) then, in step 265, the depth sensor may be activated and depth information may be acquired to augment the updated camera image frame received from Tracking Module 210. For example, if the updated camera image frame received from Tracking Module 210 includes points that were imaged for the first time, then, the algorithm may proceed to step 265 and depth sensors may be enabled. In some embodiments, a 3DTOF camera, structured light, or stereoscopic sensors may be used to obtain depth information in step 265.

In the event that there are no new points ("N" in step 260), for surface reconstruction, the model may not be extended and the algorithm returns to step 255 to begin another iteration. For example, for surface reconstruction, if the new camera image frame does not include new points the algorithm may return to step 255 to wait for the next update and depth sensors may be disabled or may stay disabled (if they were previously disabled).

In some embodiments using volumetric reconstruction, depth data may be acquired at some specified rate (e.g. once every five frames).). Otherwise, the depth sensors may be disabled. For example, the depth sensors may be turned off or placed in standby mode. A depth map may be used to determine distances to the estimated surface from a given point in space, such as the location of the camera center. Accordingly, in some embodiments using volumetric reconstruction, the depth sensor may be activated periodically (based on the specified rate) and depth information may be acquired to augment the updated camera image frame received from Tracking Module 210.

For volumetric reconstruction, in some embodiments, higher quality may be achieved by fusing additional measurements of points or areas of the environment that are already represented in the existing model. Accordingly, in embodiments where volumetric reconstruction is used, the model or 3D mesh may be updated even in situations where there are no new points. In some embodiments, a threshold may be set to limit the number of times the same surface element is updated.

In either approach, if the frame rate of Tracking Module 210 is sufficiently high, then, the camera pose is unlikely to have undergone changes (or may have changed minimally) from the time of the most recent updated frame (obtained from Tracking Module 210) and the capture of depth information using depth sensors in step 265. Accordingly, the depth information acquired in step 265, may be associated with the most recent updated frame and associated pose with minimal or no loss of accuracy.

In another embodiment, a new image comprising both color image and depth information may be acquired in step 265 and a new camera pose for the new color+depth image may be obtained. In another embodiment, a new image comprising both color image and depth information may be acquired in step 265 and the camera pose associated with most recent updated frame obtained from Tracking Module 210 may be associated with the newly captured color+depth image. As noted above, for a sufficiently high frame rate, the inter-frame camera pose change from the most recent updated frame obtained from Tracking Module 210 and the newly captured color+depth image may be minimal so that any accuracy degradation may be minimal.

In some embodiments, a 3DTOF camera, structured light, or stereoscopic image may be captured to obtain a color image and depth information in step 265. In embodiments where passive stereo sensors are used, the stereo image pair (e.g. from the most recent updated image captured by Tracking Module 210 using the passive stereo sensors) may now be processed to obtain depth information.

Accordingly, if the updated camera image frame received from Tracking Module 210 includes points that were imaged for the first time (for surface reconstruction) or after the appropriate frame interval based on the specified frame rate (for volumetric reconstruction), then, the algorithm may proceed to step 265 and depth sensors may be enabled to obtain depth information. Thus, in some embodiments, while Tracking Module 210 may operate continuously, power intensive operations involving depth acquisition are performed only sporadically in step 265 thereby conserving power.

The algorithm may then proceed to routine 275, where the 3D reconstruction of the environment being modeled may be extended based on the newly acquired depth data.

FIG. 2B shows a flowchart for routine or method 275 to extend reconstruction using a surface reconstruction technique. In some embodiments, routine 275 may be invoked by or form part of Reconstruction Module 250. In some embodiments, routine 275 may accept, as input, the updated camera pose 304 and color+depth image 302 comprising color and depth information captured in step 265. In some embodiments, updated camera pose 304 may be the most recent pose computed by routine 225.

In some embodiments, in step 305, input color+depth image 302 may be optionally filtered to remove noise components and downsampled. In some embodiments, the level of downsampling may be based, in part, on the accuracy of the depth sensor, the accuracy of camera pose estimation 304, and/or other system parameters. For example, in one embodiment, a color+depth image of 640× 480 color+depth pixels may be downsampled to 320×240 color+depth pixels. In some embodiments, the color and depth images may be down-sampled at different rates. For example, in one embodiment, the image color information may be kept at a full resolution while the depth information may be down-sampled.

For example, if a 640×480 color+depth pixel image was not downsampled in step 305, then the resulting partial mesh, in step 310, could result in as many as 639*479*2=612,162 triangles. If the image was downsampled to 320×240, in step 305, then, the number of triangles would be no more than 152,482 triangles. Thus, based on various system parameters, downsampling may be advantageously used in step 305, to reduce the computational complexity of the reconstruction and speed up the process with minimal impact to the 3D reconstruction, which may thereby contribute to additional efficiencies in power consumption.

In step 310, for a surface reconstruction, a partial mesh may be generated based on the depth image and the camera pose. In one embodiment, the surface reconstruction module may use the depth information to extrude the color image along a viewing direction and create a textured or colored dense 3D mesh. For example, a mesh may be composed of triangles that may be used to render the image. The term "partial mesh" refers to a mesh created from single color+depth image 302, which was obtained in step 265. The term "existing mesh" refers to the result, at a point in time, obtained from the combination or merging of all partial meshes together.

When the first partial mesh is created, it is automatically used as the existing mesh. When any other subsequent partial mesh is created, the subsequent partial mesh is merged with the existing mesh. In some embodiments, the meshes are created from keyframes with associated camera poses and sparse 3D points with descriptors originating from the keyframes. The keyframes, which include depth information, are selected images which are captured at camera poses that are relatively distant from one another in terms of rotation and translation of the camera. In some embodiments, a global coordinate system may be defined based on the camera pose associated with the first keyframe.

In step 320, the overlap between the existing mesh and the partial mesh is determined. In some embodiments, routine 375 may further use the 6DOF pose 304 of the tracking system (computed by routine 225) to initially align a new partial mesh with the existing mesh. In some embodiments, in step 325, depending on the pose estimation accuracy of the tracking system routine 375 may optionally further refine the alignment using methods such iterative closest point (ICP). The ICP algorithm minimizes differences between the partial mesh and overlapping sections of the existing mesh. In one embodiment, the ICP algorithm may iteratively perform the following steps to refine the alignment of the partial mesh with overlapping portions of the existing mesh: associate nearest neighbor points in the two meshes, estimate transformation parameters using a mean square cost function, and then transform the points using the estimated parameters before beginning the next iteration.

Next, in step 330, once the partial mesh has been aligned with the existing mesh, the reconstruction module may reduce any duplicated detail from the partial mesh that is already present in the existing mesh. In some embodiments, in step 330, any duplicated detail may either be removed, or may be fused or merged with the existing mesh—for example by averaging all nearby/corresponding vertex positions. In another embodiment, duplicated details may either be removed, or may be fused/merged with the existing model based on a variety of other heuristics. For example, in one embodiment, the most recent observation of a detail might be kept. In another embodiment, duplicate details may be fused in a way that preserves the smoothness of the existing mesh.

In step 335, texture or vertex color information may be added to the partial mesh, after removal of duplicated information, using information in input color image 302. In step 340, the partial mesh is merged into the existing mesh. In some embodiments, duplicated information may be removed from the partial mesh prior to merging the partial mesh with the existing mesh. In another embodiment, as described above, the meshes may be merged, without removing duplicated information, for example, by averaging all nearby or corresponding vertex positions in the partial and existing meshes, or by using other heuristics. Consequently, the existing mesh may grow and become more complete. In some embodiments, the surface reconstruction approach may obtain depth information from the depth sensors on-demand. For example, a surface reconstruction approach may acquire depth information on-demand, such as once or twice per second at the beginning of a mapping sequence and only every few seconds towards the end resulting in significantly lower depth-sensor usage and a corresponding decrease in power-consumption.

FIG. 2C shows a flowchart for routine or method 275 to extend reconstruction using a volumetric reconstruction technique. In some embodiments, routine 275 may be invoked by or form part of Reconstruction Module 250. In some embodiments, routine 275 may accept, as input, the updated camera pose 304 and color+depth image 302 comprising color and depth information captured in step 265. In some embodiments, updated camera pose 304 may be the most recent pose computed by routine 225.

In some embodiments, in step 305, input color+depth image 302 may be optionally filtered to remove noise components and downsampled. In some embodiments, the level of downsampling may be based, in part, on the accuracy of the depth sensor, the accuracy of camera pose estimation 304, and/or other system parameters. Thus, based on various system parameters, downsampling may be advantageously used in step 305, to reduce the computational complexity of the reconstruction and speed up the process with minimal impact to the 3D reconstruction, which may thereby contribute to additional efficiencies in power consumption.

In step 350, a volumetric data set may be generated and/or updated based on the depth image and the camera pose. In some embodiments, in step 350, the depth data from the camera frame is fused into a computationally efficient volumetric data structure. In one embodiment, the volumetric reconstruction may use an implicit representation of the surface using a 3D distance function.

In embodiments using volumetric reconstruction, depth data may be acquired at some specified rate (e.g. once every five frames).). Otherwise, the depth sensors may be disabled. For example, the depth sensors may be turned off or placed in standby mode. A depth map may be used to determine distances to the estimated surface from a given point in space, such as the location of the camera center. Accordingly, in some embodiments using volumetric reconstruction, the depth sensor may be activated periodically (based on the specified rate) and depth information may be acquired to augment the updated camera image frame received from Tracking Module 210.

For volumetric reconstruction, in some embodiments, higher quality may be achieved by fusing additional measurements of points or areas of the environment that are already represented in the existing model. Accordingly, in embodiments where volumetric reconstruction is used, the volumetric dataset may be updated even in situations where there are no new points. In some embodiments, a threshold may be set to limit the number of times the same surface element is updated.

In step 355, surface extraction may be performed from the volumetric data set/3D mesh using a variety of techniques. For example, the Marching Cubes algorithm may be used to extract the surface. In some embodiments, for a volumetric reconstruction, surface extraction is done in a separate step that is independent of the fusion step.

In some embodiments, volumetric reconstruction may use a fixed data rate (e.g. 5 color+depth frames per second), which may be dynamically configurable. For example, the frequency of updates from the depth camera may be varied (increased or decreased) based on application requests (e.g. lower or higher accuracy of the model requested) or based on contextual cues (e.g. low or high battery level on the device). In some embodiments, the surface extraction step may be performed independently of the fusion.

Figure 2D:
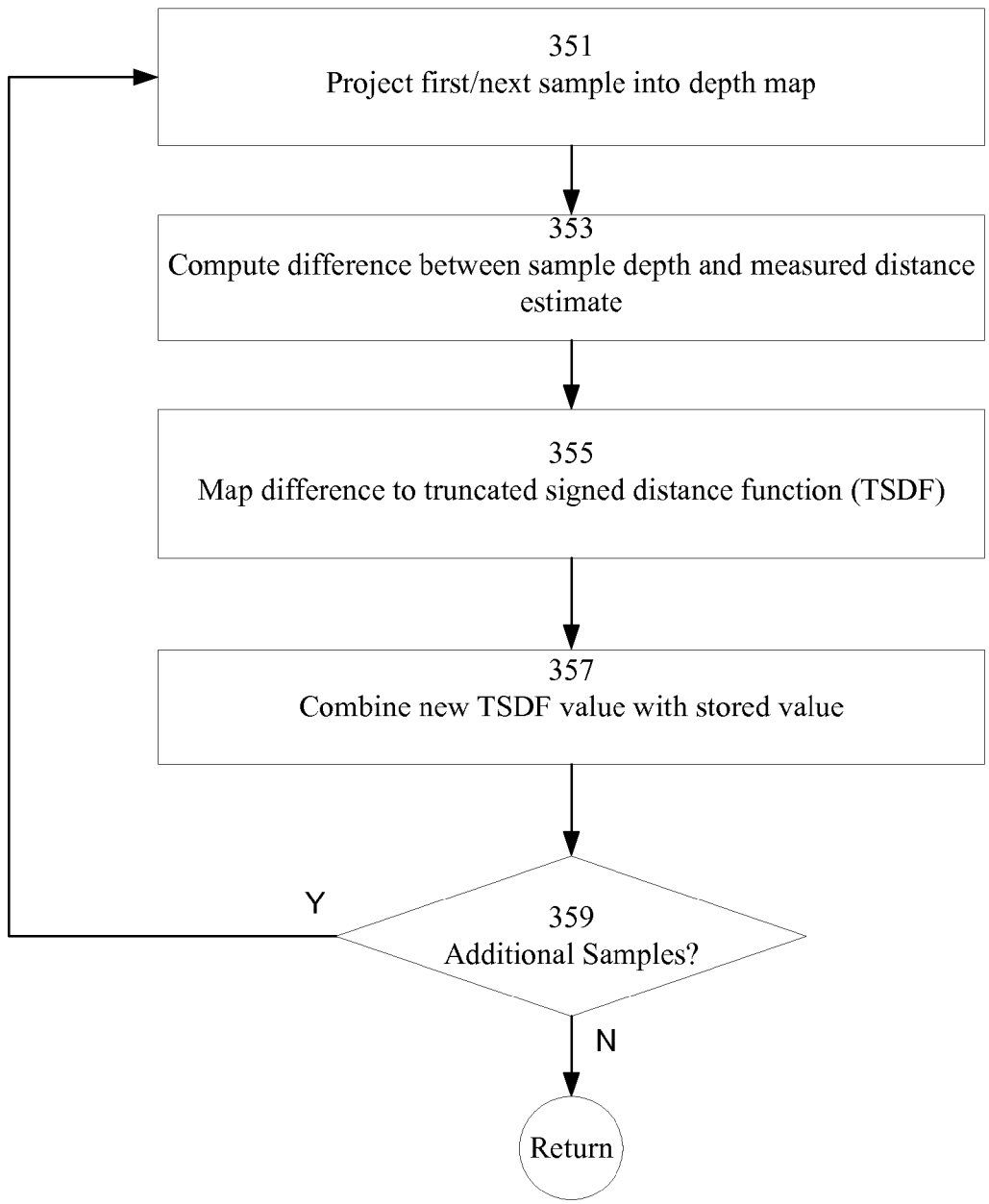
FIG. 2D shows a flowchart depicting an exemplary method for fusing depth data from the camera frame into the volumetric dataset consistent with disclosed embodiments.

FIG. 2D shows a flowchart depicting an exemplary method for fusing depth data from the camera frame into the volumetric dataset. A 3D truncated signed distance function (TDSF) may be used to represent as a set of regular samples in 3D space. At each sample, the TDSF (sample) value yields the signed distance to the estimated surface, where positive distances indicate samples outside the object, while negative distances indicate samples inside the object.

In some embodiments using volumetric reconstruction, depth data may be acquired at some specified rate (e.g. once every five frames) and a depth map may be used to determine distances to the estimated surface from a given point in space, such as the location of the camera center. These distances can then be mapped to the signed distance in the volumetric data set.

In step 351, each sample in the volume may be transformed into the camera coordinate system of the depth map and the sample may be projected into the depth map based on the input camera pose to obtain a measured distance to the surface along a ray. The distance value at that projected pixel provides a measured distance estimate to the surface along the ray.

Next, in step 353, difference between the sample depth and measured distance estimate is computed. The measured relative distance from the sample location to the surface is defined as the difference between the sample depth and measured distance.

In step 355, the measured relative distance is mapped to the TDSF and, in step 357, the mapped TDSF value may be combined with stored value. For example, the distance estimate (s) provided by the sample point on the ray may be updated by combining the distance estimate (s) with the relative distance using a recursive filter. For example, one implementation may use weight w with the distance estimate s and update the distance estimate s based on a new measurement m by using a weighted update, which may be given by $$s = \frac{(s*w) + m}{w + 1}$$

and w=w+1.

In step 359, if additional samples are to be processed ("Y" in step 359) then another iteration starting may be commenced to process the next sample. If there are no further samples ("N" in step 359), control may be returned to the calling routine.

In some embodiments, Tracking Module 210 and Reconstruction Module 250 may be run in parallel. For example. Tracking Module 210 and Reconstruction Module 250 may run as separate threads or processes. In some embodiments, Tracking Module 210 and Reconstruction Module 250 may run on separate processor cores.

In some embodiments, method 200 described above, may facilitate real-time 3D reconstruction with power efficient depth sensor usage. In one embodiment, while the visual tracking system may run continuously at appropriate frame rates, the 3D reconstruction module may acquire image+depth data sporadically. For example, the rate at which color+depth image pairs may be acquired, while application dependent, may be higher at the beginning of a mapping sequence and may decrease substantially towards the end. In some embodiments, relative to conventional methods where depth information is continuously acquired, method 200 above may be able to reduce the number of frames that require depth information by an order of magnitude or more, thereby resulting in significant power savings.

In some exemplary implementations, the visual tracking system may run continuously at a frame rate of 30 fps, while the 3D reconstruction module acquires image+depth data sporadically. In general, the rate at which color+depth images are acquired depends on the specific usage. However, in some typical use cases, 3D reconstruction module may acquire image+depth data once or twice per second at the beginning of a mapping sequence, and only once every few seconds towards the end of the mapping sequence. Thus, relative to conventional implementations, which require color+depth information at all times, embodiments described herein reduce the number of frames for which depth information is acquired by a factor of 10 or more relative to conventional implementations. Accordingly, in instances, where the depth sensor may be enabled and disabled quickly and with minimal overhead, the power consumption for depth acquisition in CV applications in disclosed embodiments may be 10% or less of the power consumed by traditional methods.

Figure 3:
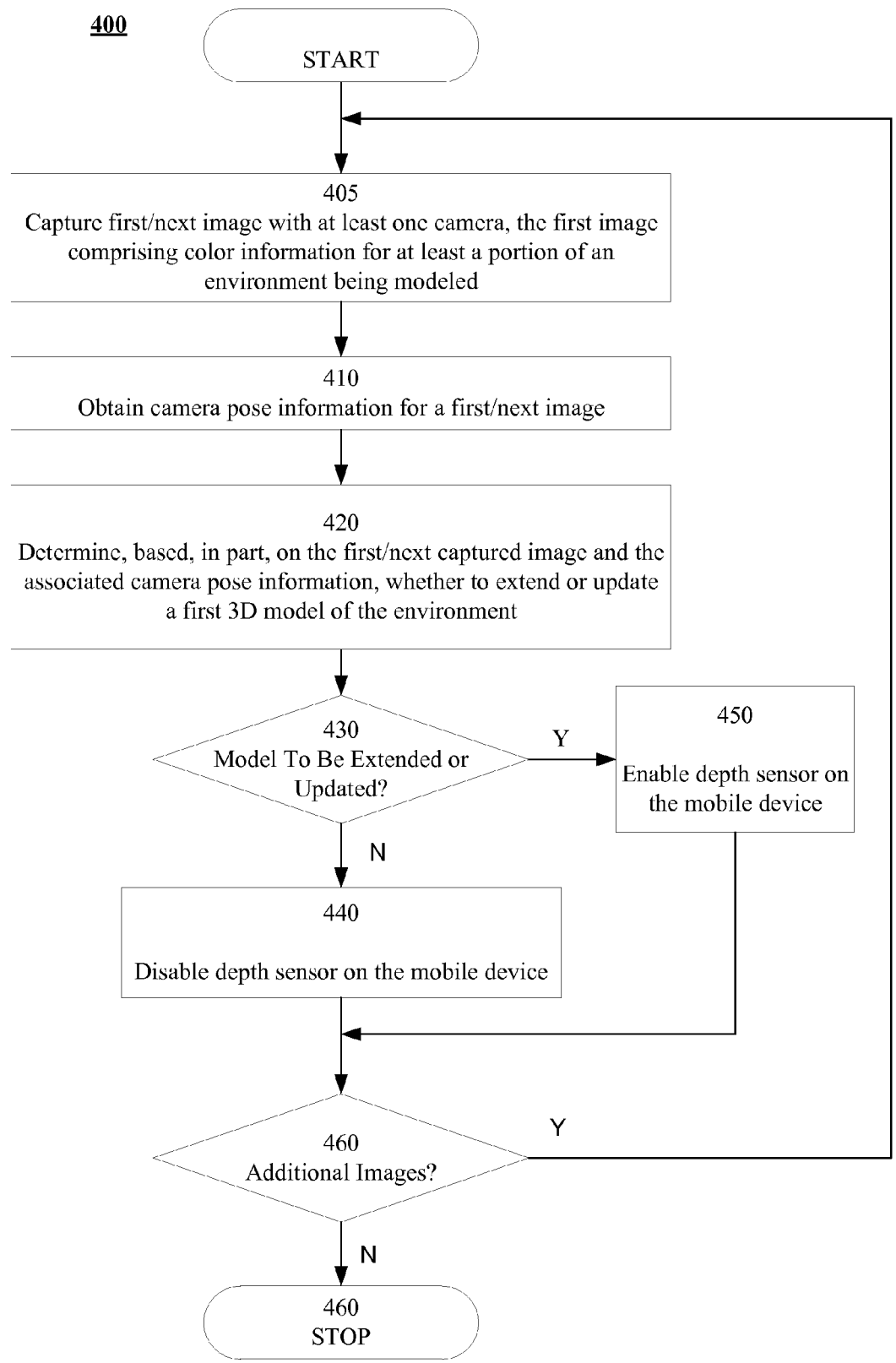
FIG. 3 shows a flowchart of exemplary method 400 for 3D reconstruction consistent with disclosed embodiments.

FIG. 3 shows a flowchart of exemplary method 400 for 3D reconstruction consistent with disclosed embodiments. In some embodiments, method 400 may be performed by processors 150. In some embodiments, portions of method 400 may be executed by CV module 155.

In step 405, a first (or next) image may be captured using at least one camera, wherein the first image comprises color information for at least a portion of an environment being modeled. In some embodiments, the first image may be captured using a camera(s) 110 on MS 100.

Next, in step 410, the camera pose information for the first (or next) image captured by the camera may be obtained step 420. In some embodiments, portions of steps 405 and 410 may be performed by Tracking Module 210.

In step 420, a determination may be made based, in part, on the first (or next) captured image and the associated camera pose information, whether to extend or update a first 3-Dimensional (3D) model of an environment being modeled by the mobile device. In some embodiments, surface and/or volumetric reconstruction techniques may be used for the 3D model and decisions regarding model extension may be made in a manner consistent with the specific technique being used for the modeling.

For example, for surface reconstruction, based on the first (next) image and camera pose, a determination of the degree to which the image includes information that is not currently represented in an existing model of the environment may be made. For example, for surface reconstruction, a determination whether to extend the existing model of the environment may be based on whether there are points or areas of the environment that are already represented in the existing model but were imaged for the first time from a different viewpoint in a newly captured camera frame.

In step 430, if the model is not to be extended or updated ("N" in step 430), then, in step 440, the depth sensor on MS 100 may be disabled. For a volumetric reconstruction, for example, the depth sensor may be disabled for appropriate intervals between frames depending on the frequency at which depth information is being acquired. For a surface reconstruction, for example, the depth sensor may be disabled if the image does not include new information. For volumetric reconstruction, where depth information may be acquired periodically at a specified rate, the depth sensors may be enabled at appropriate intervals based on the specified rate. Otherwise, the depth sensors may be disabled. For example, the depth sensors may be turned off or placed in standby mode.

In some embodiments, for both the surface reconstruction and volumetric reconstruction cases, disabling the depth sensor may comprise at least one of: turning off power supplied to the depth sensor, or disabling functionality related to computation of a depth image. For example, the depth sensors may be turned off or placed in standby mode. In some embodiments, for example, when a stereo vision sensor is disabled images captured by camera 110 may be monocular. Further, in some embodiments, by disabling the depth sensor computation associated with the processing of stereo images captured from passive stereo vision sensors may also be disabled. For example, in one embodiment, although stereo images may be captured by a passive stereo vision sensor, processors 150 may not process the stereo images and may instead select a single image from the stereo pair for processing. Accordingly, in some embodiments, the 3D reconstruction module acquires/uses depth data sporadically thereby conserving power.

On the other hand, if the model is to be extended or updated ("Y" in step 430), then, in step 450, the depth sensor on MS 100 may be enabled. For example, for a surface reconstruction, if the 3D model of the environment being modeled is to be extended, because the first (next) image includes enough new information then, image and depth information may then be obtained by turning on the appropriate depth sensors in conjunction with the capture of an image and associated pose information.

As another example, for a volumetric reconstruction where depth information is being acquired at some specified rate, then, the depth sensor may be enabled based on the specified rate and the 3D model of the environment may be updated with new depth information. For volumetric reconstruction, in some embodiments, higher quality may be achieved by fusing additional measurements of points or areas of the environment that are already represented in the existing model. Accordingly, in embodiments where volumetric reconstruction is used, the model or 3D mesh may be updated even in situations where there are no new points. In some embodiments, a threshold or other parameters may be set to limit the number of times the same surface element is updated.

For example, in some embodiments, a second image may be captured with the at least one camera. Further, the second image may be augmented with depth information provided, at least in part, by the depth sensor.

For a surface reconstruction, a partial model of the environment being modeled by the MS may be merged with the first 3D model of the environment. The partial model may be based, in part, on the second image, and the depth and camera pose information for the second image. In some embodiments, information common to the first 3D model and the partial 3D model may be removed from the partial 3D model prior to merging the partial 3D model with the first 3D model. In some embodiments, the partial model may be based on a downsampled lower resolution augmented second image. In some embodiments, the partial model of the environment being modeled by the MS may be aligned with the first 3D model of the environment based on the camera pose information for the second image. In some embodiments, the alignment of the partial 3D model with the first 3D model may be refined using Iterative Closest Point (ICP).

For a volumetric reconstruction, depth data may be acquired at some specified rate (e.g. once every five frames) and a depth map may be used to determine distances to the estimated surface from a given point in space, such as the location of the camera center. These distances can then be mapped to the signed distance in the volumetric data set. Accordingly, each sample in the volume may be transformed into the camera coordinate system of the depth map and the sample may be projected into the depth map based on the input camera pose to obtain a measured distance to the surface along a ray. The distance value at that projected pixel provides a measured distance estimate to the surface along the ray.

Next, the difference between the sample depth and measured distance estimate may be computed. The measured relative distance from the sample location to the surface, which is defined as the difference between the sample depth and measured distance, may then be mapped to the TDSF and the mapped TDSF value may be combined with stored value. For example, the distance estimate (s) provided by the sample point on the ray may be updated by combining the distance estimate (s) with the relative distance using a recursive filter. For example, one implementation may use weight w with the distance estimate s and update the distance estimate s based on a new measurement m by using a weighted update, which may be given by $$s = \frac{(s*w)+m}{w+1}$$

and w=w+1.

If there are additional images to be processed ("Y" in step 460), then the process returns to step 410 to begin another iteration. For example, if 3D reconstruction and/or the mapping sequence is incomplete, a determination to acquire additional images may be made and a new iteration is started in step 405. Otherwise, if there are no further images ("N" in step 460), the method may terminate.

The methodologies described herein may be implemented by various means depending upon the application. For example, for a firmware and/or software implementation, the methodologies may be implemented with modules (e.g., procedures, functions, and so on) that perform the functions described herein. Any machine-readable medium tangibly embodying instructions may be used in implementing the methodologies described herein.

For example, software code may be stored in a memory and executed by a processor unit such as processor(s) 150 on MS 100. In some embodiments, the functions may be stored as one or more instructions or code on a computer-readable medium. Examples include computer-readable media encoded with a data structure and computer-readable media encoded with a computer program. Computer-readable media includes physical computer storage media.

A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method on a Mobile Station (MS) comprising at least one camera and a depth sensor, the method comprising:
    capturing a first image with the at least one camera, the first image comprising color information for an environment being modeled by the MS;
    obtaining a camera pose for the first image;
    determining, based, in part, on color information in the first image and the camera pose for the first image, whether to update a volumetric dataset associated with a first 3-Dimensional (3D) model of the environment; and
    enabling the depth sensor to capture depth information when the first 3D model is to be updated, wherein the captured depth information is used, at least in part, to update the first 3D model using volumetric reconstruction.

2. The method of claim 1, wherein enabling the depth sensor comprises at least one of:
    turning on power supplied to the depth sensor, or
    enabling functionality related to computation of a depth image.

3. The method of claim 1, further comprising:
    maintaining disablement of the depth sensor, when the first 3D model is not extended.

4. The method of claim 1, wherein a determination to update the volumetric dataset is made when:
    the color information in the first image includes data pertaining to one or more points in the environment, which are unrepresented in the volumetric dataset; or
    the color information in the first image includes data pertaining to one or more points in the environment represented in the volumetric dataset and for which additional depth data is desired; or the first image is the last of a predetermined number of consecutive images with color information since the depth sensor was last enabled.

5. The method of claim 1, wherein upon enabling the depth sensor, the first 3D model is updated using volumetric reconstruction by:
   capturing, with the at least one camera, a second image with color information;
   augmenting the second image with the captured depth information provided by the depth sensor; and
   fusing, based, in part, on a camera pose for the second image, the augmented second image with the volumetric dataset associated with the first 3D model.

6. The method of claim 5, wherein the volumetric dataset is represented using a Truncated Signed Distance Function (TDSF).

7. The method of claim 6, wherein fusing the augmented second image with the volumetric dataset comprises:
   determining the camera pose for the second image;
   projecting, based on the camera pose for the second image, one or more data samples in the TDSF into a depth map based on the augmented second image;
   determining, for each of the one or more data samples projected into the depth map, a corresponding measured relative distance from a location of the projected data sample to a surface defined by the TDSF;
   obtaining, for each of the one or more data samples projected into the depth map, a corresponding mapped TDSF value by mapping the corresponding measured relative distance to the TDSF; and
   combining, for each of the one or more one or more data samples in the TDSF, the corresponding mapped TDSF value with a stored TDSF value for the data sample.

8. The method claim 7, wherein combining comprises:
   applying a recursive filter to combine the corresponding mapped TDSF value with the stored TDSF value.

9. A Mobile Station (MS) comprising:
   a camera, the camera to capture a first image comprising color information for an environment being modeled by the MS,
   a depth sensor coupled to the camera; and
   a processor coupled to the depth sensor and the camera, the processor configured to:
      obtain a camera pose for the first image;
      determine, based, in part, on color information in the first image and the camera pose for the first image, whether to update a volumetric dataset associated with a first 3-Dimensional (3D) model of the environment; and
      enable the depth sensor to capture depth information when the first 3D model is to be updated, wherein the captured depth information is used, at least in part, to update the first 3D model using volumetric reconstruction.

10. The MS of claim 9, wherein to enable the depth sensor, the processor is configured to perform at least one of:
   turn on power supplied to the depth sensor, or
   enable functionality related to computation of a depth image.

11. The MS of claim 9, wherein the processor is further configured to:
   maintain disablement of the depth sensor, when the first 3D model is not extended.

12. The MS of claim 9, wherein the processor is configured to make a determination to update the volumetric dataset when:
   the color information in the first image includes data pertaining to one or more points in the environment, which are unrepresented in the volumetric dataset; or
   the color information in the first image includes data pertaining to one or more points in the environment represented in the volumetric dataset and for which additional depth data is desired; or
   the first image is the last of a predetermined number of consecutive images with color information since the depth sensor was last enabled.

13. The MS of claim 9, wherein to update first 3D model using volumetric reconstruction upon enabling the depth sensor, the processor is configured to:
   capture, with the at least one camera, a second image with color information for the environment;
   augment the second image with the captured depth information provided by the depth sensor; and
   fuse, based, in part, on a camera pose for the second image, the augmented second image with the volumetric dataset associated with the first 3D model.

14. The MS of claim 13, wherein the volumetric dataset is represented using a Truncated Signed Distance Function (TDSF).

15. The MS of claim 14, wherein to fuse the augmented second image with the volumetric dataset, the processor is configured to:
   determine the camera pose for the second image;
   project, based on the camera pose of the second image, one or more data samples in the TDSF into a depth map based on the augmented second image;
   determine, for each of the one or more data samples projected into the depth map, a corresponding measured relative distance from a location of the projected data sample to a surface defined by the TDSF;
   obtain, for each of the one or more data samples projected into the depth map, a corresponding mapped TDSF value by mapping the corresponding measured relative distance to the TDSF; and
   combine, for each of the one or more one or more data samples in the TDSF, the corresponding mapped TDSF value with a stored TDSF value for the data sample.

16. The MS of claim 15, wherein, the processor is configured to combine the corresponding mapped TDSF value with the stored TDSF value by applying a recursive filter.

17. An apparatus comprising:
   imaging means, the imaging means to capture a first image comprising color information for an environment being modeled by the MS,
   depth sensing means coupled to the imaging means, and
   processing means coupled to the depth sensing means and the imaging means, the processing means further comprising:
      means for obtaining an imaging means pose for the first image,
      means for determining, based, in part, on color information in the first image and the imaging means pose for the first image, whether to update a volumetric dataset associated with a first 3-Dimensional (3D) model of the environment; and
      means for enabling the depth sensing means to capture depth information when the first 3D model is to be updated, wherein the captured depth information is used, at least in part, by means for updating the first 3D model using volumetric reconstruction.

18. The apparatus of claim 17, wherein the means for enabling the depth sensing means comprises at least one of:
   means for turning on power supplied to the depth sensing means, or
   means for enabling functionality related to computation of a depth image.

19. The apparatus of claim 17, wherein the processing means further comprises:
   means for maintaining disablement of the depth sensing means, when the first 3D model is not extended.

20. The apparatus of claim 17, wherein the means for determining determines to update the volumetric dataset when:
   the color information in the first image includes data pertaining to one or more points in the environment, which are unrepresented in the volumetric dataset; or
   the color information in the first image includes data pertaining to one or more points in the environment represented in the volumetric dataset and for which additional depth data is desired; or
   the first image is the last of a predetermined number of consecutive images with color information since the depth sensing means was last enabled.

21. The apparatus of claim 17, wherein means for updating first 3D model using volumetric reconstruction upon enabling the depth sensor comprises:
   means for capturing, with the at least one imaging means, a second image with color information for the environment;
   means for augmenting the second image with the captured depth information provided by the depth sensing means; and
   means for fusing, based, in part, on an imaging means pose for the second image, the augmented second image with the volumetric dataset associated with the first 3D model.

22. The apparatus of claim 21, wherein the volumetric dataset is represented using a Truncated Signed Distance Function (TDSF).

23. The apparatus of claim 22, wherein means for fusing the augmented second image with the volumetric dataset comprises:
   means for determining the imaging means pose for the second image;
   means for projecting, based on the imaging means pose for the second image, one or more data samples in the TDSF into a depth map based on the augmented second image;
   means for determining, for each of the one or more data samples projected into the depth map, a corresponding measured relative distance from a location of the projected data sample to a surface defined by the TDSF;
   means for obtaining, for each of the one or more data samples projected into the depth map, a corresponding mapped TDSF value by mapping the corresponding measured relative distance to the TDSF; and
   means for combining, for each of the one or more one or more data samples in the TDSF, the corresponding mapped TDSF value with a stored TDSF value for the data sample.

24. A non-transitory computer-readable medium comprising instructions, which when executed by a processor, perform steps in a method on a Mobile Station (MS) comprising at least one camera and a depth sensor, the method comprising:
   capturing a first image with the at least one camera, the first image comprising color information for at least a portion of an environment being modeled by the MS;
   obtaining a camera pose for the first image;
   determining, based, in part, on color information in the first image and the camera pose for the first image, whether to update a volumetric dataset associated with a first 3-Dimensional (3D) model of the environment; and
   enabling the depth sensor to capture depth information when the first 3D model is to be updated, wherein the captured depth information is used, at least in part, to update the first 3D model using volumetric reconstruction.

25. The computer-readable medium of claim 24, wherein enabling the depth sensor comprises at least one of:
   turning on power supplied to the depth sensor, or
   enabling functionality related to computation of a depth image.

26. The computer-readable medium of claim 24, further comprising:
   maintaining disablement of the depth sensor, when the first 3D model is not extended.

27. The computer-readable medium of claim 24, wherein a determination to update the volumetric dataset is made when:
   color information in the first image includes data pertaining to one or more points in the environment, which are unrepresented in the volumetric dataset; or
   color information in the first image includes data pertaining to one or more points in the environment represented in the volumetric dataset and for which additional depth data is desired; or
   the first image is the last of a predetermined number of consecutive images with color information since the depth sensor was last enabled.

28. The computer-readable medium of claim 24, wherein upon enabling the depth sensor, the first 3D model is updated using volumetric reconstruction by:
   capturing, with the at least one camera, a second image with color information for the environment;
   augmenting the second image with the captured depth information provided by the depth sensor; and
   fusing, based, in part, on a camera pose for the second image, the augmented second image with the volumetric dataset associated with the first 3D model.

29. The computer-readable medium of claim 28, wherein the volumetric dataset is represented using a Truncated Signed Distance Function (TDSF).

30. The computer-readable medium of claim 29, wherein fusing the augmented second image with the volumetric dataset comprises:
   determining the camera pose for the second image;
   projecting, based on the camera pose of the second image, one or more data samples in the TDSF into a depth map based on the augmented second image;
   determining, for each of the one or more data samples projected into the depth map, a corresponding measured relative distance from a location of the projected data sample to a surface defined by the TDSF;
   obtaining, for each of the one or more data samples projected into the depth map, a corresponding mapped TDSF value by mapping the corresponding measured relative distance to the TDSF; and combining, for each of the one or more one or more data samples in the TDSF, the corresponding mapped TDSF value with a stored TDSF value for the data sample.

* * * * *